United States Patent [19]
Dusheck, Jr.

[11] 3,805,170
[45] Apr. 16, 1974

[54] TRANSITION DETECTOR

[75] Inventor: George J. Dusheck, Jr., Cinnaminson, N.J.

[73] Assignee: The United States of America as represented by the Secretary of the Navy, Washington, D.C.

[22] Filed: Jan. 3, 1969

[21] Appl. No.: 788,877

[52] U.S. Cl.................. 328/114, 328/127, 328/132, 307/231, 330/110
[51] Int. Cl............................................ G01r 29/02
[58] Field of Search .......... 307/232, 235, 295, 236, 307/318; 328/142, 150, 114, 118, 132, 142; 330/110, 69, 30 D

[56] References Cited
OTHER PUBLICATIONS

Clapper, Slope Discriminator, IBM Technical Disclosure Bulletin, pg. 30, Vol. 3, No. 9, Feb. 1961.

*Primary Examiner*—Maynard R. Wilbur
*Assistant Examiner*—H. A. Birmiel
*Attorney, Agent, or Firm*—Edgar J. Brower; Henry Hansen

[57] ABSTRACT

A transition detector to detect slopes in an analog input signal and produce digital outputs in response to whether or not such slopes are present. An analog signal is fed through a differentiating network and combined with a current source as the input to an operational amplifier that has a zener diode in the feedback system.

6 Claims, 2 Drawing Figures

TRANSITION DETECTOR

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to a transition detector for use in a feature recognition system which processes transient submarine signals occurring in the presence of signal-like noise and which further recognizes certain relatively invariant features exhibited by the submarine signals and not by the noise signals.

In the field of submarine detection and recognition, magnetic anomaly detection (MAD) devices and techniques have long been utilized. Basically, MAD is an airborne system employing magnetometer elements which sense the presence of a submerged submarine by measuring the small distortion in the earth's magnetic field caused thereby. This technique is an exacting one as the earth's meagnetic field intensity may be on the order of 10,000 times stronger than that of the submarine. Additionally, the high altitudes of the aircraft, or more exactly the long slant ranges to the submarine, cause the signals from the submarine to virtually disappear into the noise background. This noise is derived from a multiplicity of sources as from, for example, the magnetometer sensing element itself, the magnetic and electrical equipments of the aircraft, large magnetic fields external to the aircraft such as geologic mineral deposits beneath the ocean floor, and other phenomena.

Due to these many noise sources and the distance between sensor and submarine, the submarine signal is either completely disguised by the noise such that it cannot be recognized therefrom or the noise signals themselves produce a response similar to the submarine signals such that false recognitions are effectuated.

Prior art systems incorporated a trained human operator who memorized features or patterns known to be representative of the signature of a submarine and whose function it was to visually recognize and extract these submarine signals from data displayed before him. The accuracy of such a technique was relatively low and varied with the individual operator. In addition, all of the operators fatigued with time thus further decreasing accuracy. The result was that many false alarms were indicated and many actual targets were entirely missed.

Thus there arose a need for a system capable of automatically and electronically recognizing and detecting, with a high degree of accuracy and reliability, submarine signals occurring in the presence of signal-like noise.

SUMMARY OF THE INVENTION

Accordingly, it is the general purpose of the present invention to provide a transition detector for use in a feature recognition system which fulfills the need for a highly accurate, fully automatic submarine detection system. The recognition system operates upon incoming MAD signals containing both submarine signals and signal-like noise, by abstracting the primary feature or positive and negative slopes thereof, and by utilizing and processing these primary features to recognize and detect relatively invariant submarine signals therefrom.

The recognition system is divided into two major functional areas, the preprocessor system and the processor or signal recognition and detection system. The transition detector is utilized in the processor. The preprocessor receives MAD amplitude-time domain information (i.e., varying amplitude signals in the time domain) and passes them through a plurality of filter channels each having a different bandwidth and center frequency to provide time waveforms in the amplitude-time-frequency domain (i.e., signals varying in both amplitude and frequency but having the same time base as the received MAD signals). Thereafter, the preprocessor both prepares the amplitude-time-frequency domain primary signals for (slope) feature abstraction and actually performs the feature abstraction operation. The processor receives the primary feature abstracted signals and detects and recognizes therefrom the relative presence of invariant submarine signals or features as a function of degree of probability of detection and slant range from airborne feature recognition system to submerged submarine.

The processor comprises a plurality of recognition logic networks, each network including a member of logic circuits and each logic circuit per range being representative of a particular probability of detection as determined from empirical data, test results, and analysis. After the information is processed, if it satisfies the particular range criteria for the particular probability of detection for that range it is displayed thereby indicating a detected target (i.e., a submarine) with a degree of certainty equal to the degree of probability for the range.

The logic components comprise both analog and ditial circuitry. The transition detector (TD) serves as an interface between this circuitry. It is used to detect a change or transition in an analog signal and provides a digital "1" output siganl upon detection. A "0" output signal is provided in the absence of detection.

The TD is a combination differentiator and threshold detector. It includes an operational amplifier having inverting and noninverting inputs. The analog signal is fed through a differentiating network to the inverting input. Appropriate bias circuitry also provides a selectively variable input bias current to this input. A zener diode in the feedback loop of the amplifier is also connected to this input. Other elements are connected to control voltage offset, phase shift, and positive and negative voltage swings. Depending upon the magnitude and polarity of the analog signal differentiated by the input differentiator and the polarity of the circuitry providing the input bias current, the zener diode may be made either forward or back biased. In the forward biased mode, the TD provides a digital "1" while a digital "0" is provided in the back biased mode.

DESCRIPTION OF THE PREFERRED EMBODIMENT

Figures 1, 1A:
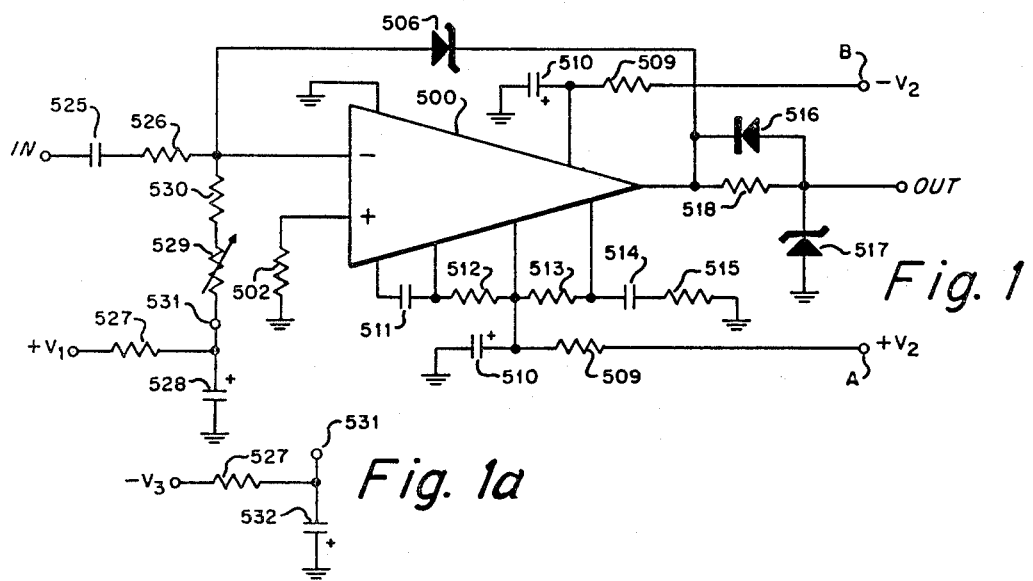
FIG. 1 is a schematic diagram of an OFF transition detector.
FIG. 1a is a schematic diagram showing a modification of FIG. 1 such that the detector thereof may be made ON responsive.

The transition detector of FIGS. 1 and 1a is a combination differentiator and threshold detector and is used to detect a change or transition in the primary features (i.e., slopes) or other analog siganls. Whenever a transition is detected the circuit yields a digital "1" output. Conversely, when a transition is not present, the circuit yields a digital "0" output. Inasmuch as the TD receives analog input signals and provides digital output signals it may be thought as an analog-to-digital converter.

The transition detector may comprise the standard operational amplifier 500 manufactured by National Semiconductor Corporation (NS 7560). Like amplitude, positive and negative operating voltage is applied at points A and B as shown through the decoupling networks comprising resistors 509 and capacitors 510. Diode 516 limits the negative output swing of the operational amplifier while the combination of resistor 518 and zener 517 limits the positive output swing. Similarly, capacitor 511, capacitor 514 and resistor 515 provide phase compensation while the series combination of resistors 513 and 512 balance the voltage offset of the amplifier. Network gain is in this case determined by the zener diode 506 alone.

The input to the operational amplifier 500 of the transition detector, however, is substantially different from that of the level detector. More particularly, analog input signal is fed through a differentiating network comprising capacitor 525 in series with resistor 526 to the inverting input of the operational amplifier 500. An input bias current is also fed to this inverting input from an input bias circuit comprising the positive voltage source $V_1$ which feeds a decoupling network, comprising resistor 527 and capacitor 528, and a threshold adjusting resistor 529, which may be variable, and an attenuating resistor 530. Thus, the value of the current fed to the inverting input of the operational amplifier 500 is determined by the series combination of the ohmic values of resistors 529, 530.

As shown the transition detector will detect negative transitions or turnoffs in the slopes. It has been found in detecting submarine signals that this type of condition occurs much more frequently than positive transitions or turn ons. However, should it be desired to detect turn on information it is necessary only to replace at point 531 the decoupling network of FIG. 1 with that of FIG. 1a wherein a negative voltage source $-V_3$ and the capacitor 532 are utilized respectively in lieu of the positive voltage source $V_1$ and the capacitor 528. The absolute value of $V_3$ should be greater than of $V_1$ as experience has shown that the capacity of capacitor 528 should be greater than that of the capacitor 532. Of course the polarity of the capacitors must be changed when polarity of voltage sources is changed.

In operation, and with no input signal being received at the input terminal, the bias current fed into the inverting input terminal of the amplifier 500 causes the output thereof to be driven negative sufficient to forward bias zener diode 506. This forward biasing balances the bias current at the inverting input terminal. If a positive going input signal is applied to this input terminal it will add to the bias current causing the output to change. However, this change is such that it increases the forward current through diode 506 and again balances the net input current. Thus the output of the amplifier remains fairly constant (at approximately —0.7 volts) for zero or rising input signals.

For negative going input signals, however, the signal current will tend to cancel the bias current. If the negative rate of change (i.e., the derivative as taken by the differentiating network comprising capacitor 525 and resistor 526) of the input signal is sufficient to completely cancel the bias current, the zener diode 506 will appear as a high impedance thereby placing amplifier 500 in a high gain condition. Thus, if a negative going rate of change of input signal is slightly greater than that required to offset the bias current, the output of the transition detector will rapidly rise. This will force reverse current through zener 506 in an attempt to balance the current at the inverting input terminal of operational amplifier 500. The output will rise to the breakdown voltage of the zener 506 (approximately three volts) in order to feed back this canceling current. If the rate of change of input signal is very fast the output will rise sufficiently to feed back enough current to cancel the net input current. Depending on the sharpness of the zener breakdown, the faster rate of change input signals will have little effect on the output voltage. It should be noted that the bias current or threshold of the transition detector may be set by varying resistor 529. Increasing the resistor decreases the bias current and results in the detection of smaller rate of fall transitions.

Should it be desired to detect transitions in the positive slopes, the bias circuit of FIG. 1a is used as indicated hereinabove in lieu of the bias circuit of FIG. 1. With this slight modification positive going transitions will be detected in the same manner as the aforediscussed negative transitions. When the modification of FIG. 1a is utilized in the recognition logic, however, a NAND gate should be connected to the TD output so that the state of the output signal is identical with that of the TD of FIG. 1 so that the remaining logic components can accommodate it.

As noted hereinabove, the transition detector is intended to supply digital logic. However, the output levels of the amplifier 500 may not meet the input requirements of that logic. Thus the diode 516 is utilized to limit the negative swing of the output signal. More particularly, diode 516 converts the nominal —0.7 volt output signal to about —0.3 volt output signal thereby more closely approximately a zero output condition. If the breakdown of diode 516 is sharp enough then a "1" condition (i.e., an output voltage between 2 volts and 5.5 volts will be met). Accordingly, diode 516 may be selected such that the "knees" of its voltage-current curve are sufficiently sharp as to require no additional limiting. Alternatively, the resistor 518 and zener 517 may be added to the circuit to provide sufficient "1" condition drive for the digital circuitry since the diode 517 has a high impedance.

Obviously many modifications and variations of the present invention are possible in the light of the above teachings. It is therefore to be understood that within the scope of the appended claims the invention may be practiced otherwise than as specifically described.

What is claimed is:

1. A circuit for providing a digital output signal in response to detecting a transition in a received analog signal comprising:

an operational amplifier having at least an inverting and a non-inverting input;

a substantially unilateral impedance operatively connected at one end thereof to said inverting input of said operational amplifier and at the other end thereof to the output of said operational amplifier;

differentiator means including a first capacitor in series relation with a first resistor connected to said inverting input of said operational amplifier for differentiating the received analog signals; and input bias circuit means operatively connected to said inverting input and polarized to receive and accommodate voltage potential of a predetermined polarity for providing a bias current and said input bias circuit means further includes a second resistor receiving said voltage potential, a variable resistor means for providing preselectable threshold levels, said variable resistor means includes a variable resistor operatively connected to said first and said second resistors, and a second capacitor grounded at one end thereof and operatively connected at its other end to said second resistor and said variable resistor, whereby said operational amplifier provides a high digital output signal when the analog signal differentiated by said differentiating means cancels the bias current produced by said bias circuit means.

2. A circuit for providing a digital output signal in response to detecting a transition in a received analog signal according to claim 1 further comprising:

first means connected to the output of said operational amplifier for limiting the positive output swing thereof; and second means connected at one end thereof to said first means and at the other end thereof to said substantially unilateral impedance means for limiting the negative output swing of said operational amplifier.

3. A circuit for providing a digital output signal in response to detecting a transition in a received analog signal according to claim 2 further comprising:

a first decoupling network connected to an input of said operational amplifier; and a second decoupling network connected to another input of said operational amplifier, said first decoupling network adapted to receive a negative voltage operating potential and said second decoupling network adapted to receive a like positive operating voltage potential.

4. A circuit for providing a digital output signal in response to detecting a transition in a received analog signal according to claim 3 further comprising:

voltage balancing means operatively connected to said operational amplifier for balancing the voltage offset thereof; and a phase compensation network connected to said voltage balancing means and said operational amplifier.

5. A circuit for providing a digital output signal in response to detecting a transition in a received analog signal according to claim 4 wherein:

said substantially unilateral impedance means comprises a zener diode, the anode of which is connected to said inverting input of said operational amplifier and the cathode of which is connected to the output of said operational amplifier.

6. A circuit for providing a digital output signal in response to detecting a transition in a received analog signal according to claim 5 wherein:

said voltage balancing means comprises a resistor circuit; and said phase compensation network comprises a resistor-capacitor circuit.

* * * * *